United States Patent
Kwon et al.

(10) Patent No.: US 12,128,653 B2
(45) Date of Patent: Oct. 29, 2024

(54) DISPLAY DEVICE AND METHOD FOR MANUFACTURING SAME

(71) Applicant: Samsung Display Co., Ltd., Yongin-si (KR)

(72) Inventors: Ohjune Kwon, Hwaseong-si (KR); Chanho Moon, Suwon-si (KR); Junghan Seo, Hwaseong-si (KR); Sunghoon Yang, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 488 days.

(21) Appl. No.: 17/335,709

(22) Filed: Jun. 1, 2021

(65) Prior Publication Data

US 2022/0078926 A1    Mar. 10, 2022

(30) Foreign Application Priority Data

Sep. 4, 2020    (KR) .......................... 10-2020-0113152

(51) Int. Cl.
*B32B 27/08*    (2006.01)
*B32B 3/26*    (2006.01)
(Continued)

(52) U.S. Cl.
CPC .............. *B32B 27/08* (2013.01); *B32B 3/263* (2013.01); *B32B 3/266* (2013.01); *B32B 7/12* (2013.01); *B32B 37/12* (2013.01); *B32B 38/145* (2013.01); *H04M 1/0264* (2013.01); *H04M 1/0266* (2013.01); *B32B 2457/20* (2013.01); *H04N 23/57* (2023.01)

(58) Field of Classification Search
CPC ......... B32B 27/08; B32B 3/263; B32B 3/266; B32B 7/12; B32B 37/12; B32B 38/145; B32B 2457/20; H04N 23/57; G06F 3/041; H04M 1/0264; H04M 1/0266
See application file for complete search history.

(56) References Cited

U.S. PATENT DOCUMENTS

| 10,191,516 B2 | 1/2019 | Jang et al. |
| 2020/0045826 A1 | 2/2020 | Wang et al. |
| 2022/0005877 A1 | 1/2022 | Seo et al. |

FOREIGN PATENT DOCUMENTS

| KR | 10-2018-0062273 | 6/2018 |
| KR | 20190026476 A * | 3/2019 |

(Continued)

OTHER PUBLICATIONS

Translation of KR20190140692 (description and claims). (Year: 2019).*

(Continued)

*Primary Examiner* — Catherine A. Simone
(74) *Attorney, Agent, or Firm* — KILE PARK REED & HOUTTEMAN PLLC

(57) ABSTRACT

A display device includes a support member including a through-hole, a polymer film disposed above a support member, a display panel disposed above a polymer film, a protective layer disposed above a display panel, and an electronic module. The polymer film includes a protrusion portion protruding toward the support member. The electronic module is disposed in a position corresponding to the through-hole and facing the protrusion portion.

19 Claims, 7 Drawing Sheets

(51) Int. Cl.
*B32B 7/12* (2006.01)
*B32B 37/12* (2006.01)
*B32B 38/00* (2006.01)
*H04M 1/02* (2006.01)
*H04N 23/57* (2023.01)

(56) References Cited

FOREIGN PATENT DOCUMENTS

| KR | 10-2019-0140692 | 12/2019 |
| KR | 10-2019-0140795 | 12/2019 |
| KR | 10-2020-0014459 | 2/2020 |
| KR | 10-2102681 | 4/2020 |
| KR | 10-2022-0004871 | 1/2022 |

OTHER PUBLICATIONS

Translation of KR20190026476A (bib, description and claims). (Year: 2019).*

* cited by examiner

DISPLAY DEVICE AND METHOD FOR MANUFACTURING SAME

CROSS-REFERENCE TO RELATED APPLICATION(S)

This application claims priority to and benefits of Korean Patent Application No. 10-2020-0113152 under 35 U.S.C. § 119, filed on Sep. 4, 2020 in the Korean Intellectual Property Office, the entire contents of which are incorporated herein by reference.

BACKGROUND

1. Technical Field

The disclosure herein relates to a display device and a method for manufacturing the same, and more particularly, to a display device including an electronic module and a method for manufacturing same.

2. Description of the Related Art

Various types of display devices are used to output or display various types of image information. Such display devices may include an electronic module for receiving external signals and/or providing output signals to the outside. For example, the electronic module may include a camera module or the like. Demand increases for a display device capable of obtaining high-quality images captured by an electronic module such as a camera.

To increase an image displaying area of a display device, it is desirable to dispose an electronic module or the like in the image displaying area. Accordingly, the display devices have been developed to include a through-hole into which the electronic module can be inserted.

However, there have been drawbacks in the display devices including a through-hole such that components positioned above the through-hole may be deformed when a pressure or the like is applied from above the through-hole.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device in which a stepped region of a support member having a through-hole is compensated.

The disclosure also provides a method for manufacturing a display device in which a stepped region of a support member having a through-hole is compensated.

In an embodiment, a display device may include a support member including a through-hole, a polymer film which disposed above the support member and including a protrusion portion protruding toward the support member; a display panel disposed above the polymer film; a protective layer disposed above the display panel; and an electronic module disposed in a position corresponding to the through-hole and facing the protrusion portion.

In an embodiment, the protrusion portion and the electronic module may overlap each other within the through-hole.

In an embodiment, a bottom surface of the protrusion portion may contact a top surface of the electronic module, and a top surface of the protrusion portion may be in contact with a bottom surface of the polymer film.

In an embodiment, the protrusion portion may have a transmittance of about 85% or more in a wavelength range of about 400 nm to about 800 nm.

In an embodiment, an area of a bottom surface of the protrusion portion may be greater than or equal to an area of a top surface of the electronic module.

In an embodiment, a bottom surface of the protrusion portion may include an uneven pattern.

In an embodiment, the display device may further include a transparent adhesive disposed between the protrusion portion and the electronic module.

In an embodiment, the display device may further include a light blocking portion that surrounds a side surface of the protrusion portion.

In an embodiment, the light blocking portion may fill at least a portion of the through-hole.

In an embodiment, the protrusion portion may include first polymer resin, and the polymer film may include second polymer resin different from the first polymer resin.

In an embodiment, an edge of the protrusion portion may contact a surface of the support member.

In an embodiment, the protrusion portion may have a trapezoidal shape in a cross-sectional view. The trapezoidal shape may have a short side and a long side facing each other.

In an embodiment, a method for manufacturing a display device may include providing a display panel, forming a polymer film below the display panel, the polymer film including a protrusion portion, disposing a protective layer above the display panel, disposing a support member below the polymer film, the support member including a through-hole, bonding the support member, the polymer film, the display panel, and the protective layer with each other, and disposing an electronic module in a position that corresponds to the through-hole and faces the protrusion portion. The protrusion portion may protrude towards the support member.

In an embodiment, the protrusion portion may include first polymer resin, and the polymer film may include second polymer resin different from the first polymer resin.

In an embodiment, the forming of polymer film may include forming the protrusion portion and the polymer film by an inkjet process, and photo-curing the protrusion portion and the polymer film In an embodiment, the protrusion portion and the polymer film may be formed simultaneously.

In an embodiment, the forming of the polymer film may include forming an uneven pattern on a bottom surface of the protrusion portion that faces the electronic module.

In an embodiment, the bonding of the support member, the polymer film, the display panel, and the protective layer may include forming an adhesive layer between the protrusion portion and the electronic module.

In an embodiment, the bonding of the support member, the polymer film, the display panel, and the protective layer may include disposing a light blocking portion between the protrusion portion and the through-hole.

In an embodiment, the bonding of the support member, the polymer film, the display panel, and the protective layer may include providing a roller above the protective layer to perform a pressing process on the protective layer.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
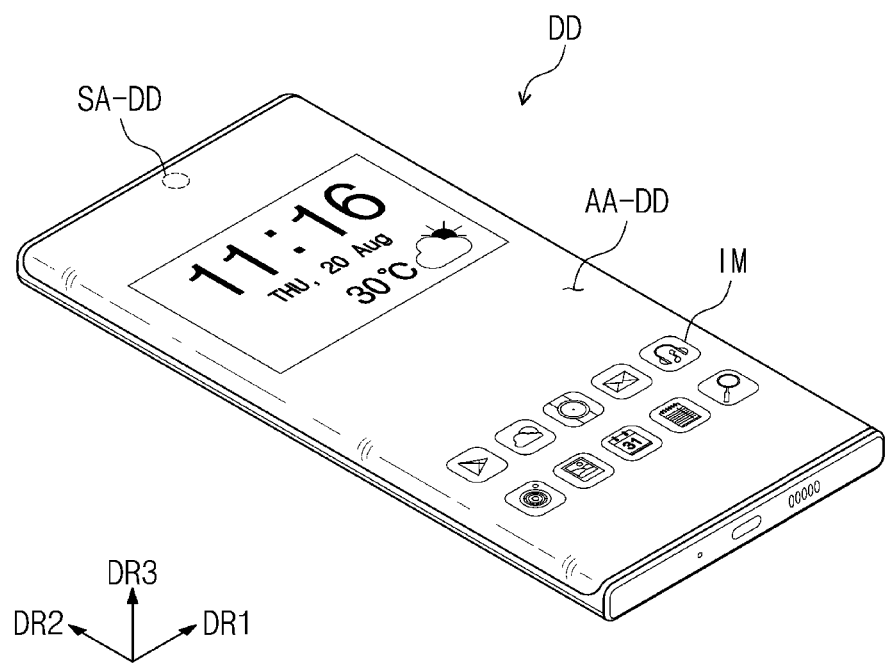
FIG. 1 is a schematic perspective view showing a display device of an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the specification, it will be understood that when an element (or a region, a layer, a portion, or the like) is referred to as being "on", "connected to" or "coupled to" another element in the specification, it can be directly disposed on, connected, or coupled to another element mentioned above, or intervening elements may be disposed therebetween.

Like numbers refer to like elements throughout. Also, in the drawings, the thicknesses, ratios, and dimensions of the elements are exaggerated for effective description of the technical contents.

The term "and/or" includes any and all combinations of one or more of the associated listed items.

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the disclosure. The singular forms include the plural forms unless the context clearly indicates otherwise.

Also, terms such as "below", "lower", "above", and "upper" may be used to describe the relationships of the components illustrated in the drawings. These terms have a relative concept and are described in terms of the directions indicated in the drawings.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the drawings, sizes, thicknesses, ratios, and dimensions of the elements may be exaggerated for ease of description and for clarity. Like numbers refer to like elements throughout.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Hereinafter, a display device according to an embodiment and a method for manufacturing a display device of an embodiment will be described with reference to the drawings.

Figure 2:
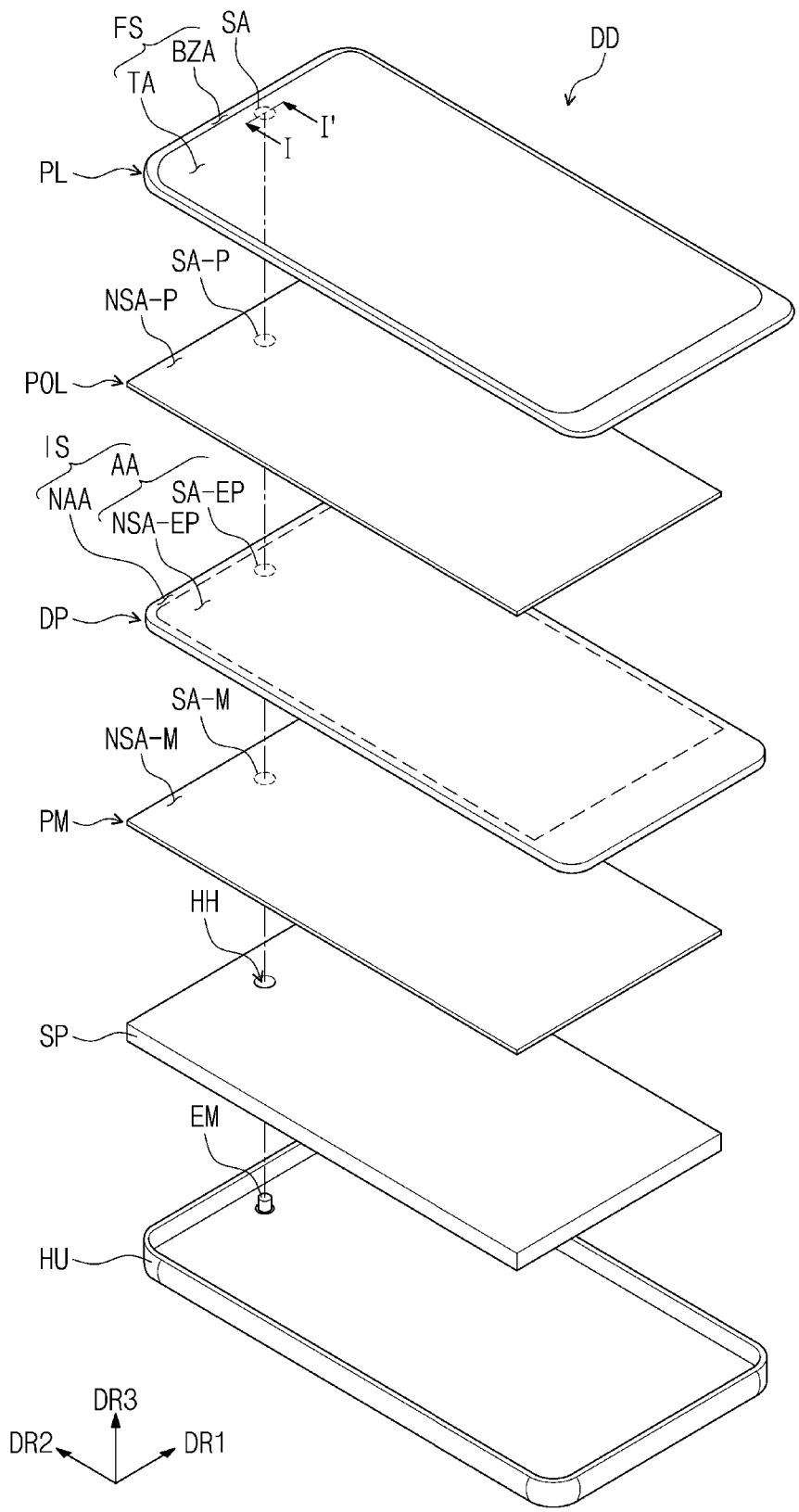
FIG. 2 is an exploded schematic perspective view showing a display device of an embodiment.
Figure 3:
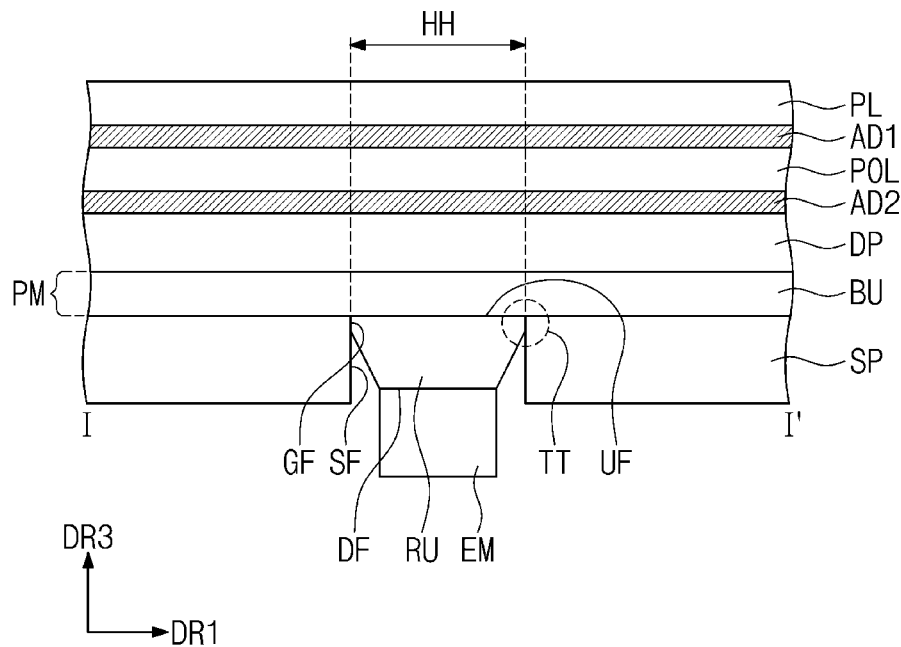
FIG. 3 is a schematic cross-sectional view taken along line I-F of FIG. 2.
Figure 4:
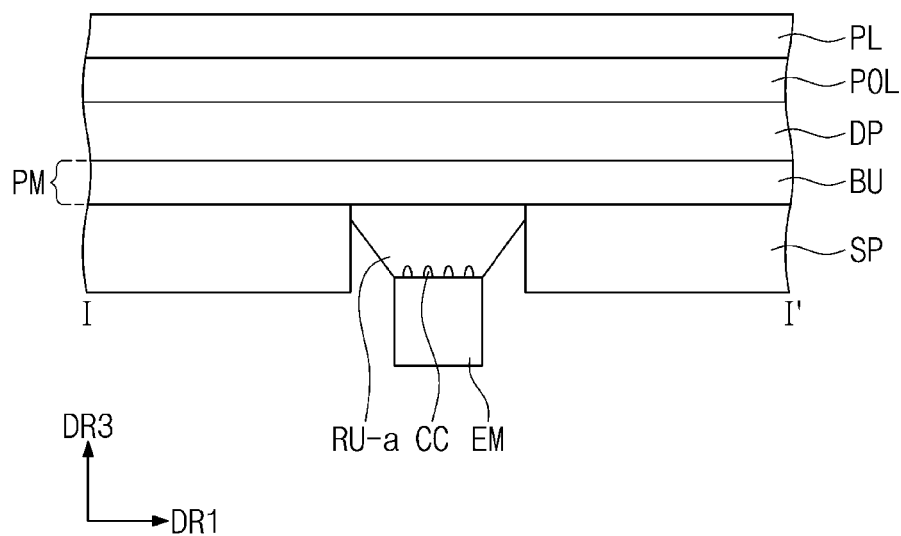
FIG. 4 is a schematic cross-sectional view showing a portion of a display device according to an embodiment.
Figure 5:
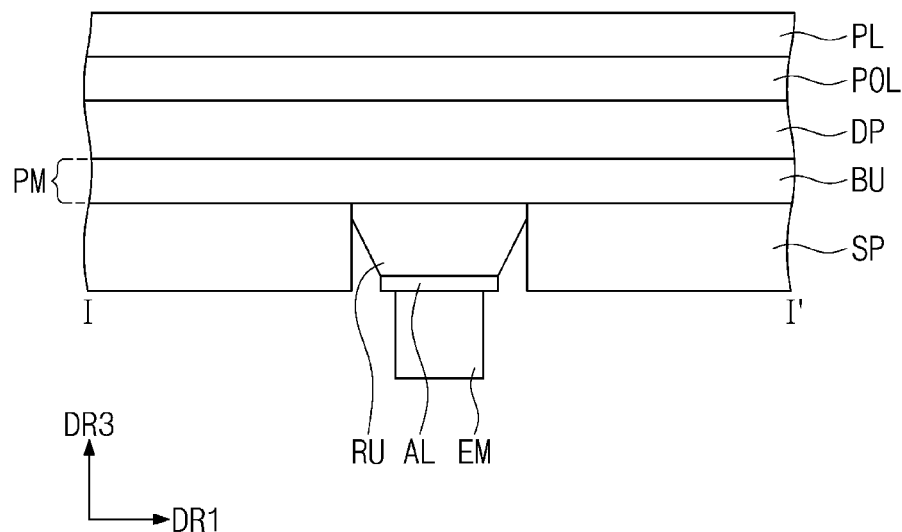
FIG. 5 is a schematic cross-sectional view showing a portion of a display device according to an embodiment.
Figure 6:
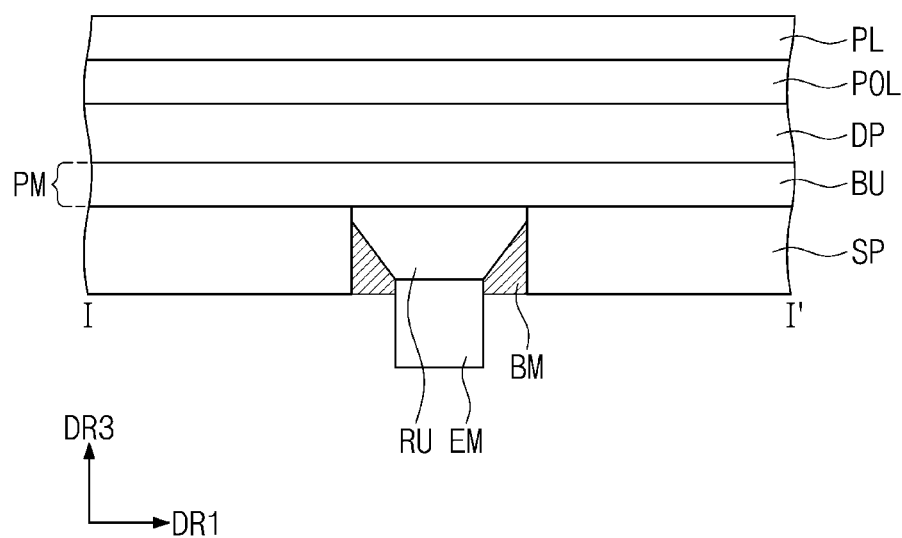
FIG. 6 is a schematic cross-sectional view showing a portion of a display device according to an embodiment.

FIG. 1 is a schematic perspective view of a display device according to an embodiment. FIG. 2 is an exploded schematic perspective view of a display device according to an embodiment. FIG. 3 is a schematic cross-sectional view taken along line I-I' of FIG. 2. FIGS. 4 to 6 are schematic cross-sectional views of display devices according to the embodiments.

A display device DD of an embodiment may be a device to be activated in response to an electrical signal. For example, the display device DD may be a mobile phone, a tablet PC, a vehicle navigation unit, a game console, or a wearable device. However, these are merely examples, and the embodiment is not limited thereto. In FIG. 1, the display device DD illustrates a mobile phone.

The display device DD may display an image IM through an active area AA-DD. The active area AA-DD may have a plane defined by a first directional axis DR1 and a second directional axis DR2. The active area AA-DD may further include a curved surface which is bent from one side of the plane defined by the first directional axis DR1 and the second directional axis DR2. FIG. 1 illustrates that the display device DD in an embodiment includes two curved surfaces which are bent from two sides, respectively, of the plane defined by the first directional axis DR1 and the second directional axis DR2. However, the shape of the active area AA-DD is not limited thereto. For example, the active area AA-DD may include only a plane without curved sides. In other examples, the active area AA-DD may further include four curved surfaces which are bent from four sides, respectively, of the plane.

The display device DD of an embodiment may be flexible. The term "flexible" indicates a property of being bendable, and may include structures that may be completely foldable to a structure bendable only by about several nanometers. For example, the display device DD may be a foldable display device. Also, the display device DD may be rigid.

In FIG. 1 and the following drawings, first directional axis DR1 to third directional axis DR3 are illustrated. The directions indicated as the first to third directional axes DR1, DR2, and DR3 illustrated in the specification may have a relative concept and thus be changed to other directions. The directions indicated as the first to third directional axes DR1, DR2, and DR3 may be referred to as first to third directions, and the same reference symbols may be used therefor. In the specification, the first directional axis DR1 and the second directional axis DR2 are orthogonal to each other, and the third directional axis DR3 may be perpendicular to the plane defined by the first directional axis DR1 and the second directional axis DR2.

In the specification, a top surface (or a front surface) and a bottom surface (or a rear surface) for each member are defined with respect to the direction in which the image IM is displayed. The front surface and the rear surface are opposite to each other in the direction in which the third directional axis DR3 extends.

A sensing area SA-DD may be defined within the active area AA-DD of the display device DD. FIG. 1 illustratively shows one sensing area SA-DD, but the number of sensing areas SA-DD is not limited thereto. The sensing area SA-DD may be a portion of the active area AA-DD. The display device DD may display an image through the sensing area SA-DD.

An electronic module EM (refer to FIG. 2) may be disposed in an area overlapping the sensing area SA-DD. The electronic module EM may receive an external input transmitted through the sensing area SA-DD or provide an output through the sensing area SA-DD.

The display device DD of an embodiment may include a support member SP, a polymer film PM disposed above the support member SP, a display panel DP disposed above the polymer film PM, a protective layer PL disposed above the display panel DP, and an electronic module EM. The support member SP may include a through-hole HH, and the electronic module EM may be disposed corresponding to the through-hole HH. In the display device DD of an embodiment, the polymer film PM includes a protrusion portion RU, and the protrusion portion RU may protrude toward the support member SP. The polymer film PM will be described in detail below.

Referring to FIG. 2, the display device DD of an embodiment may include an electronic module EM, a support member SP, a polymer film PM, a display panel DP, a polarizing plate POL, and a protective layer PL, which are stacked sequentially.

The display device DD may include a housing HU. The housing HU may be disposed below the support member SP. The electronic module EM, the support member SP, the display panel DP, and the like may be accommodated in the housing HU. When the display panel DP is accommodated inside the housing HU, a peripheral area NAA of the display panel DP may be partially bent. In the display device DD, the housing HU and the protective layer PL may define an exterior of the display device DD.

In the display device DD, the electronic module EM may be an electronic component for outputting or receiving an optical signal. For example, the electronic module EM may be a camera module that captures an image of the outside. Also, the electronic module EM may be a sensor module such as a proximity sensor or an infrared light emitting sensor.

At least a portion of the electronic module EM may be inserted into the through-hole HH of the support member SP. The support member SP may include a cushion layer and a metal support layer. The through-hole HH of the support member SP may pass through the cushion layer and the metal support layer. The cushion layer may be provided to protect the electronic module EM, the display panel DP, and the like against a physical impact applied from the outside of the display device DD. The metal support layer may be a support substrate for supporting members, which are included in the display device DD, such as the display panel DP and the like. The metal support layer may dissipate heat, shield against electromagnetic waves, and perform other functions. Also, the support member SP may prevent or reduce reflection due to the light incident from the outside. A surface of the support member SP may be black. However, the embodiments are not limited thereto.

The display panel DP may be disposed above the support member SP. The display panel DP may include an active area AA on which the image IM is displayed and a peripheral area NAA adjacent to the active area AA. A front surface IS of the display panel DP may include the active area AA and the peripheral area NAA. The active area AA may be an area to be activated in response to an electrical signal. The peripheral area NAA may be adjacent to the active area AA. The peripheral area NAA may surround the active area AA. A driving circuit or a driving wire for driving the active area AA, various signal lines or pads for providing electrical signals to the active area AA, electronic elements, and the like may be disposed in the peripheral area NAA.

The through-hole HH of the support member SP may overlap the active area AA of the display panel DP. Also, the through-hole HH may be spaced apart from the peripheral area NAA of the display panel DP on a plane parallel to the plane defined by the first directional axis DR1 and the second directional axis DR2.

The display panel DP may include a first display area NSA-EP and a second display area SA-EP. The second display area SA-EP may be an area overlapping the electronic module EM. The first display area NSA-EP may be an area which is disposed surrounding at least a portion of the second display area SA-EP. The second display area SA-EP may correspond to the sensing area SA-DD of the display device DD (refer to FIG. 1). The first display area NSA-EP may be a portion that corresponds to the active area AA-DD of the display device DD except for the sensing area SA-DD (refer to FIG. 1).

In a plan view, an area of the second display area SA-EP may be less than an area of the first display area NSA-EP. The transmittance of the first display area NSA-EP may be different from the transmittance of the second display area SA-EP. The transmittance of the second display area SA-EP may be greater than the transmittance of the first display area NSA-EP.

The polarizing plate POL may be disposed above the display panel DP. The polarizing plate POL may be disposed between the display panel DP and the protective layer PL. The polarizing plate POL may have a reflection preventing function of reducing reflection due to the light incident from the outside of the display device DD. The polarizing plate POL may include a second area SA-P overlapping the second display area SA-EP of the display panel DP and a first area NSA-P overlapping the first display area NSA-EP of the display panel DP. The second area SA-P of the polarizing plate POL may overlap the through-hole HH of the support member SP.

The protective layer PL may be disposed above the polarizing plate POL. At least one protective layer PL may be disposed above the polarizing plate POL. A sensing area SA may be defined in a transmission area TA of the protective layer PL. The sensing area SA of the protective layer PL may be defined as the sensing area SA-DD of the display device DD.

For example, the protective layer PL may include polyimide or glass having a thickness of about 100 gm or less. However, this is merely an example, and the material included in the protective layer PL is not limited thereto.

The protective layer PL includes an upper surface FS exposed to the outside. An upper surface FS of the display device DD may be substantially defined by the upper surface FS of the protective layer PL. The upper surface FS of the display device DD may correspond to a front surface of the display device DD. The upper surface FS of the display device DD may be a display surface through which the image IM (refer to FIG. 1) is displayed. The transmission area TA in the upper surface FS of the protective layer PL may be an optically transparent area. The transmission area TA may have a shape corresponding to the active area AA of the display panel DP. For example, the transmission area TA may overlap the entire surface or at least a portion of the active area AA. The image displayed on the active area AA of the display panel DP may be viewed from the outside through the transmission area TA.

A bezel area BZA in the upper surface FS of the protective layer PL may be adjacent to the transmission area TA. The bezel area BZA may cover the peripheral area NAA of the display panel DP to prevent the peripheral area NAA from being viewed from the outside.

In the display device DD of an embodiment, the polymer film PM may be disposed between the display panel DP and the support member SP. The polymer film PM may include a first film area NSA-M and a second film area SA-M. The second film area SA-M may be an area that corresponds to the through-hole HH of the support member SP. The second film area SA-M may be an area that corresponds to the electronic module EM. The first film area NSA-M may be an area which is disposed surrounding at least a portion of the second film area SA-M. The first film area NSA-M may be a portion that corresponds to the active area AA-DD of the display device DD except for the sensing area SA-DD.

FIG. 3 is a schematic cross-sectional view taken along line I-I' of FIG. 2. Referring to FIG. 3, a first adhesive layer AD1 and a second adhesive layer AD2 may be disposed on an upper side and a lower side of the polarizing plate POL, respectively. The polarizing plate POL and the protective layer PL may be attached to each other by the first adhesive layer AD1. The polarizing plate POL and the display panel DP may be attached to each other by the second adhesive layer AD2. Each of the first adhesive layer AD1 and the second adhesive layer AD2 may include a pressure sensitive adhesive (PSA), an optically clear adhesive (OCA), or an optically clear resin (OCR). However, the embodiments are not limited thereto, and at least one of the first adhesive layer AD1 and the second adhesive layer AD2 may be omitted in the display device DD.

According to an embodiment, the polymer film PM may include a protrusion portion RU that protrudes toward the support member SP. The polymer film PM may include a base portion BU and a protrusion portion RU that protrudes from the base portion BU toward the support member SP. The protrusion portion RU may overlap the second film area SA-M (refer to FIG. 2) described above. FIGS. 3 to 6 illustrate that the base portion BU is a single layer, but the embodiment is not limited thereto. The base portion BU may have a multi-layer structure.

The base portion BU may entirely overlap the display panel DP. The top surface of the base portion BU may contact the bottom surface of the display panel DP. The bottom surface of the base portion BU may contact the support member SP. The protrusion portion RU may be formed on the bottom surface of the base portion BU. The protrusion portion RU may be formed on an area of the bottom surface of the base portion BU that overlaps the through-hole HH of the support member SP.

According to an embodiment, the protrusion portion RU and the electronic module EM may overlap each other within the through-hole HH. At least a portion of the electronic module EM may be inserted into the through-hole HH. Within the through-hole HH, the bottom surface of the protrusion portion RU may contact the top surface of the electronic module EM. The top surface of the protrusion portion RU may contact the bottom surface of the base portion BU.

Referring to FIG. 3, the protrusion portion RU may have a short side and a long side facing each other in a cross-sectional view. The short side of the protrusion portion RU may be included in a bottom surface DF of the protrusion portion RU, and the long side of the protrusion portion RU may be included in a top surface UF of the protrusion portion RU. In the protrusion portion RU, the area of the top surface UF may be different from the area of the bottom surface DF. In the protrusion portion RU, the area of the top surface UF may be greater than the area of the bottom surface DF. The protrusion portion RU may have a truncated cone or truncated polygonal pyramid shape. In case that the protrusion portion RU has a truncated cone shape, the top surface UF and the bottom surface DF of the protrusion portion RU may have a circular shape. In case that the protrusion portion RU has a truncated polygonal pyramid shape, the top surface UF and the bottom surface DF of the protrusion portion RU may have a polygonal shape. However, the shape of the protrusion portion RU is not limited thereto, and the protrusion portion RU may have a cylindrical or polygonal prism shape in which the top surface and the bottom surface have the same area. In the protrusion portion RU of the embodiment, the area of the top surface may be the same as the area of the bottom. In a cross-sectional view, the protrusion portion RU may have a rectangular shape.

According to an embodiment, the area of the bottom surface DF of the protrusion portion RU may be greater than or equal to the area of the top surface of the electronic module EM. The area of the bottom surface DF of the protrusion portion RU may be the same as the area of the top surface of the electronic module EM. In other examples, the area of the bottom surface DF of the protrusion portion RU may be greater than the area of the top surface of the electronic module EM.

An edge GF of the protrusion portion RU may contact a surface SF of the support member SP. The surface SF of the support member SP may define the through-hole HH. The edge GF of the protrusion portion RU and the surface SF of the support member SP may contact each other within the through-hole HH. The one edge GF of the protrusion portion RU and the one surface SF of the support member SP may contact each other in a region adjacent to the through-hole HH.

The support member SP may have a stepped region TT. The support member SP, in which the through-hole HH is defined, may have the stepped region TT. The protrusion portion RU of the polymer film PM may compensate for the stepped region TT of the support member SP. In the embodiment, the protrusion portion RU of the polymer film PM may be inserted into the through-hole HH of the support member SP to compensate for the stepped region TT of the support member SP.

In an embodiment, the polymer film PM may include polymer resin. The protrusion portion RU may include first polymer resin. The base portion BU may include second polymer resin different from the first polymer resin. For example, the protrusion portion RU may include polyacrylate, and the base portion BU may include polyethylene terephthalate. However, this is merely an example, and the type of polymer resin is not limited thereto. Also, the second polymer resin of the base portion BU may be the same as the first polymer resin of the protrusion portion RU.

The polymer film PM may be optically transparent. The base portion BU and the protrusion portion RU may be optically transparent. The protrusion portion RU of an embodiment may have a transmittance of about 85% or more in a wavelength range of about 400 nm to about 800 nm. For example, the protrusion portion RU of an embodiment may have a transmittance of about 89% or more in a wavelength range of about 400 nm to about 800 nm. However, the embodiments are not limited thereto.

Referring to FIG. 4, a protrusion portion RU-a may include an uneven pattern CC. The uneven pattern CC may be included in the bottom surface of the protrusion portion RU-a that contacts the top surface of the electronic module EM. The uneven pattern CC may include an uneven shape in which recesses and protrusions are repeated. In an embodiment, the uneven pattern CC may be recessed away from the electronic module EM. In other examples, the uneven pattern CC may protrude toward the electronic module EM. In case that the uneven pattern CC may have a recessed shape or a protruding shape, the protrusion portion RU-a may include at least one closed curve in a cross-sectional view. In case that the protrusion portion RU includes the closed curve, the closed curve may be adjacent to the electronic module EM. However, the embodiments are not limited by the shape of the uneven pattern CC.

According to an embodiment, a transparent adhesive layer AL may be disposed between the protrusion portion RU and the electronic module EM. FIG. 5 illustrates the transparent adhesive layer AL disposed between the protrusion portion RU and the electronic module EM. The protrusion portion RU and the electronic module EM may be attached to each other by the transparent adhesive layer AL. The electronic module EM may be fixed by the transparent adhesive layer AL. The transparent adhesive layer AL may be optically transparent. The transparent adhesive layer AL may have a transmittance of about 89% or more in a wavelength range of about 400 nm to about 800 nm. The transparent adhesive layer AL may include a pressure sensitive adhesive (PSA), an optically clear adhesive (OCA), or an optically clear resin (OCR). For example, in case that the electronic module EM is a camera module, the protrusion portion RU may serve as a lens.

FIG. 6 illustrates a light blocking portion BM that surrounds a side surface of the protrusion portion RU. The light blocking portion BM may fill at least a portion of the through-hole HH. Within the through-hole HH, the remaining space other than the space into which the protrusion portion RU and the electronic module EM are inserted may be filled by the light blocking portion BM. The light blocking portion BM may prevent light leakage within the through-hole HH. The light blocking portion BM may be a black matrix.

In an embodiment, the transparent adhesive layer AL (refer to FIG. 5) may be disposed between the protrusion portion RU and the electronic module EM, and the light blocking portion BM (refer to FIG. 6) may be disposed on the side surface of the protrusion portion RU. In a display device of an embodiment, the side surface of the transparent adhesive layer AL may contact the light blocking portion BM.

In a display device not including a protrusion portion, there is a stepped region due to a through-hole of a support member. Thus, the bottom surface of the component disposed above the support member may be exposed to the outside via the through-hole. The bottom surface of a polymer film or the like disposed above the support member is exposed. A member (for example, a protective layer) disposed above the support member may be deformed due to the stepped region of the support member, and thus, the reliability of the display device is deteriorated.

The display device DD of an embodiment may include the support member SP in which the through-hole HH is defined and the polymer film PM which is disposed above the support member SP and includes the protrusion portion RU. The protrusion portion RU may protrude toward the support member SP and be inserted into the through-hole HH. Accordingly, in the display device DD of an embodiment, the stepped region of the support member SP may be compensated, and the reliability may be maintained.

Figure 7:
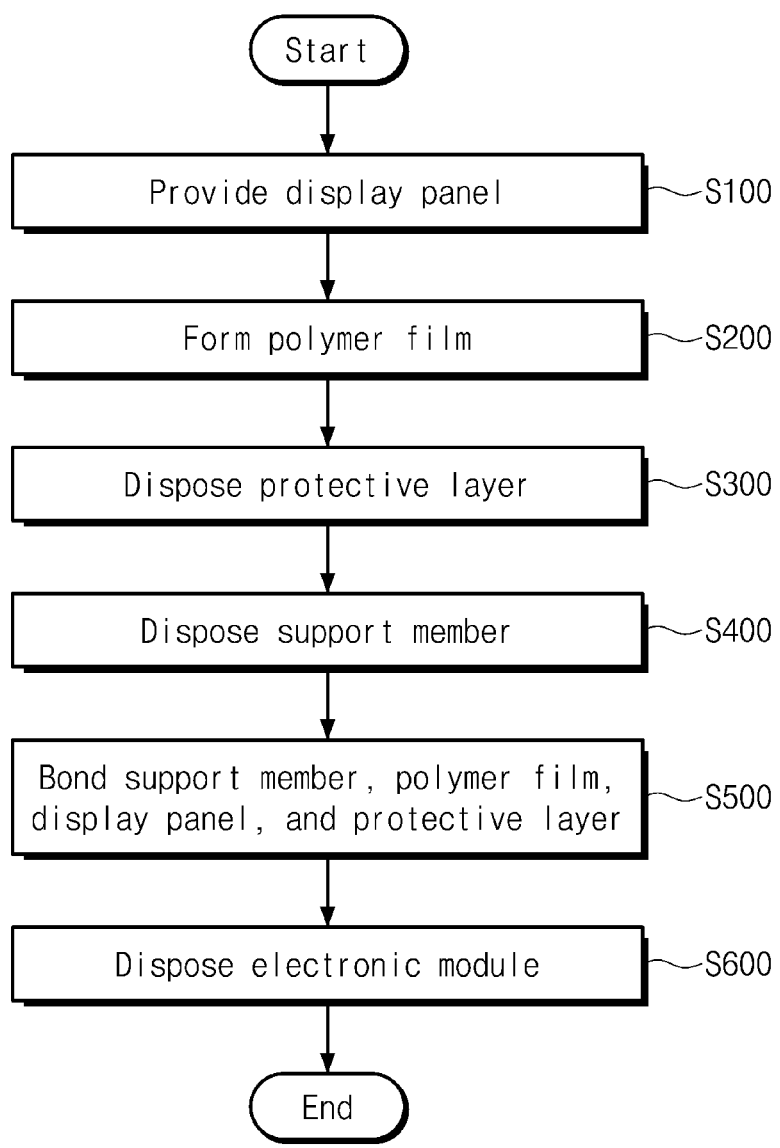
FIG. 7 is a flowchart showing a method for manufacturing a display device of an embodiment.
Figure 8:
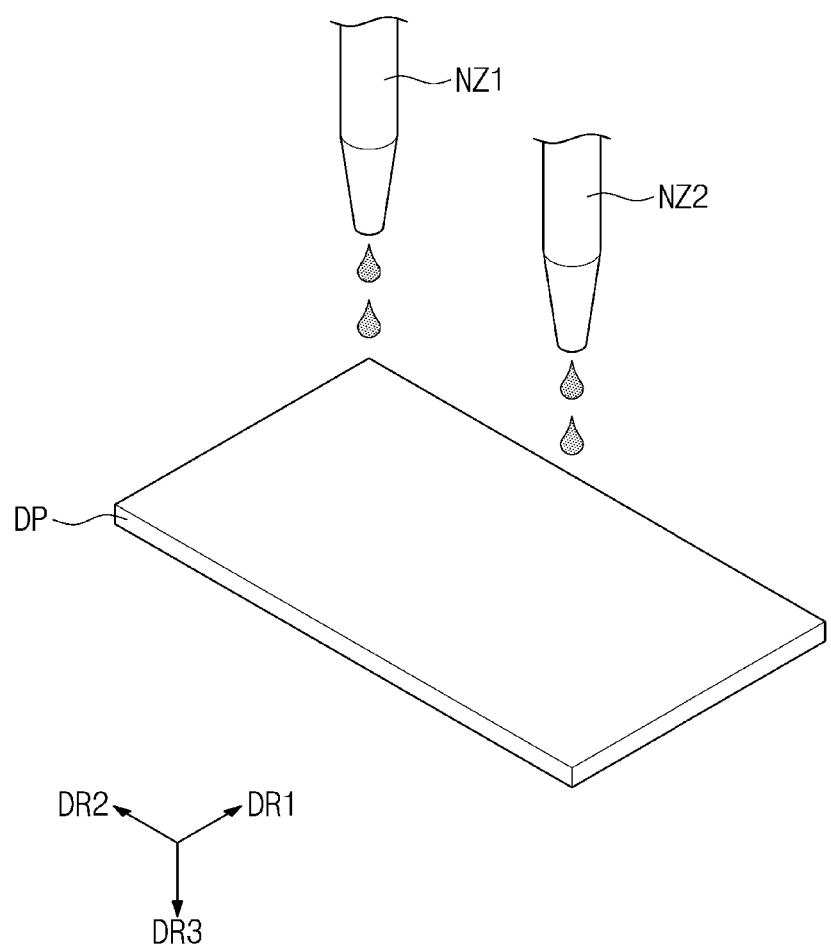
FIG. 8 is a schematic view showing an operation in a method for manufacturing a display device of an embodiment.
Figure 9:
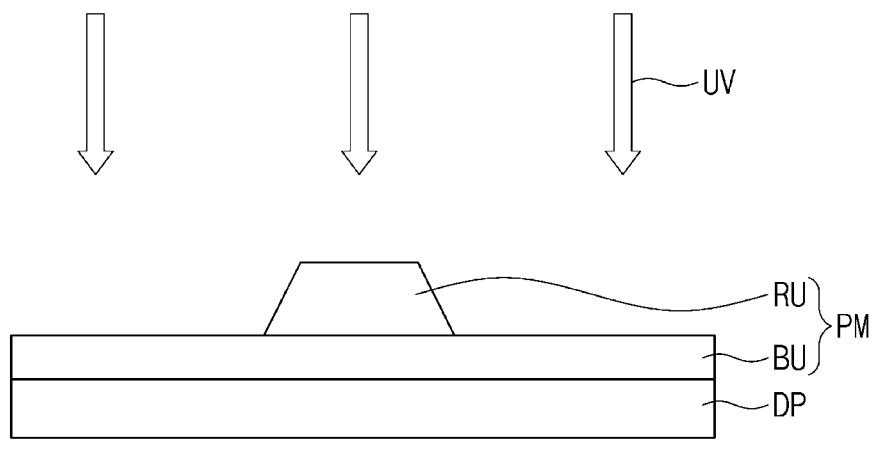
FIG. 9 is a schematic view showing an operation in a method for manufacturing a display device of an embodiment.
Figure 10:
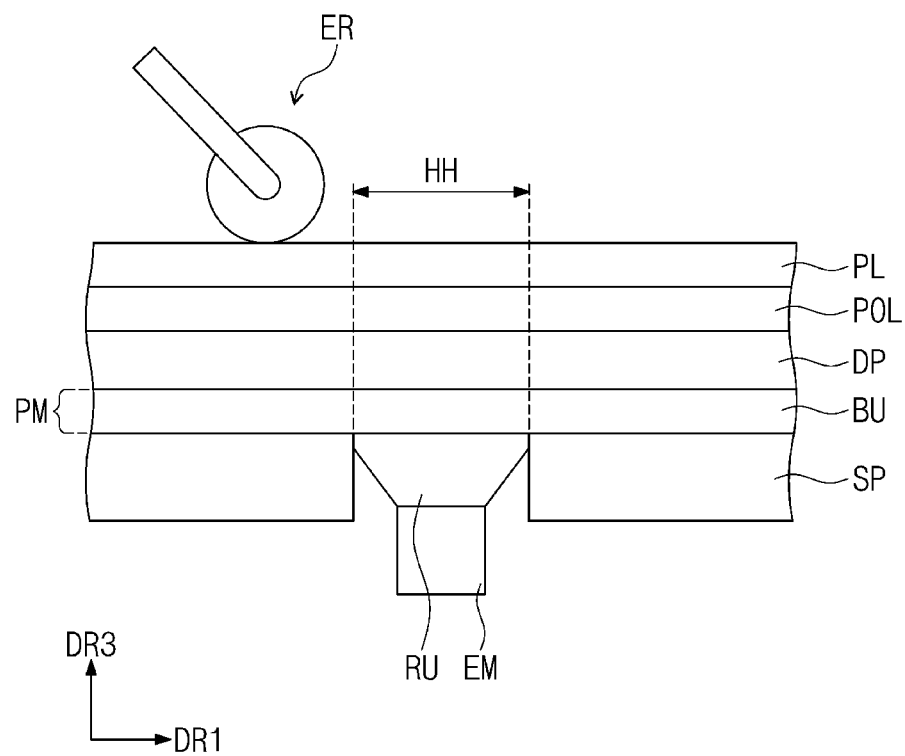
FIG. 10 is a schematic view showing an operation in a method for manufacturing a display device of an embodiment.

FIG. 7 is a flowchart showing a method for manufacturing a display device according to an embodiment. FIGS. 8 to 10 are schematic views showing each operation in a method for manufacturing a display device according to an embodiment. In the method for manufacturing a display device of the embodiment described hereinafter, contents duplicated with those of the display device of the embodiment described above are not described again, but their differences will be described.

A method for manufacturing a display device of an embodiment may include providing a display panel (S100), forming a polymer film (S200), disposing a protective layer (S300), disposing a support member (S400), bonding the support member, the polymer film, the display panel, and the protective layer (S500), and disposing an electronic module (S600). However, the embodiment is not limited thereto, and the sequence of the disposing of the protective layer and the disposing of the support member may change. The protective layer may be formed after the support member is provided.

FIG. 8 illustrates that a polymer film PM is formed on a surface of a display panel DP (S200). The polymer film PM may be formed on the bottom surface of the display panel DP. The polymer film PM may be formed by an inkjet process. Materials for forming the polymer film PM may be provided on the surface of the display panel DP through nozzles NZ1 and NZ2. In an embodiment, a base portion BU and a protrusion portion RU may be formed simultaneously. The protrusion portion RU and the base portion BU may be integrated with each other. The base portion BU and the protrusion portion RU included in the polymer film PM may be formed by a first nozzle NZ1 and a second nozzle NZ2, respectively. The first nozzle NZ1 may provide first polymer resin, and the second nozzle NZ2 may provide second polymer resin different from the first polymer resin. In other examples, the base portion BU and the protrusion portion RU may be formed of the same material through one nozzle. One of the first nozzle NZ1 or the second nozzle NZ2 may be omitted.

Referring to FIG. 9, the base portion BU and the protrusion portion RU may be cured by light UV. The light UV may be provided to cure the polymer resin. The polymer resin may be a photocurable material.

According to an embodiment, the forming of the polymer film (S200) may include forming the uneven pattern CC (refer to FIG. 4). The uneven pattern CC (refer to FIG. 4) may be formed in the bottom surface of the protrusion portion RU. The uneven pattern CC (refer to FIG. 4) may be formed in the bottom surface DF (refer to FIG. 3) of the protrusion portion RU that may contact a surface of the electronic module EM. For example, the uneven pattern CC may be engraved by a mold. The mold, in which the unevenness is formed, may be provided on the bottom surface DF (refer to FIG. 3) of the protrusion portion RU to engrave the uneven pattern CC (refer to FIG. 4). However, the embodiments are not limited by the method for forming the uneven pattern.

Subsequently, a polarizing plate POL and a protective layer PL may be disposed above the display panel DP, and a support member SP may be disposed below the polymer film PM. The support member SP, the polymer film PM, the display panel DP, the polarizing plate POL, and the protective layer PL may be stacked sequentially. A through-hole HH may be defined in the support member SP. The support member SP is provided such that the protrusion portion RU is inserted into the through-hole HH of the support member SP.

After the support member SP, the polymer film PM, the display panel DP, the polarizing plate POL, and the protective layer PL may be stacked, a roller ER may be provided above the protective layer PL, performing a pressing process on the protective layer. The roller ER may include a cushion, and the cushion of the roller ER may contact the protective layer PL. The support member SP, the polymer film PM, the display panel DP, the polarizing plate POL, and the protective layer PL may be pressed by the roller ER. However, the embodiments are not limited by the method for bonding the support member SP, the polymer film PM, the display panel DP, the polarizing plate POL, and the protective layer PL.

After the support member SP, the polymer film PM, the display panel DP, the polarizing plate POL, and the protective layer PL are bonded, an electronic module EM may be provided. At least a portion of the electronic module EM may be inserted into the through-hole HH. The electronic module EM and the protrusion portion RU may overlap each other within the through-hole HH.

The bonding operation (S500) may include providing the transparent adhesive layer AL (refer to FIG. 5) between the protrusion portion RU and the electronic module EM. The transparent adhesive layer AL may attach the protrusion portion RU to the electronic module EM. The transparent adhesive layer AL may be optically transparent. The transparent adhesive layer AL may serve as a lens.

Also, the bonding operation (S500) may include disposing a light blocking portion BM. The light blocking portion BM may fill a space between the protrusion portion RU and the through-hole HH of the support member SP. The light blocking portion BM may include an organic light blocking material or an inorganic light blocking material which includes black pigment or black dye.

The method for manufacturing a display device of an embodiment may include forming the polymer film PM that includes the protrusion portion RU, and the protrusion portion RU may be inserted into the through-hole HH of the support member SP. As the protrusion portion RU is inserted into the through-hole HH, the component disposed above the support member SP may be prevented from deforming during the bonding of the support member SP, the polymer film PM, the display panel DP, the protective layer PL, and the like which are stacked sequentially. The display panel DP, the protective layer PL, and the like may be prevented from deforming. Accordingly, the method for manufacturing a display device of an embodiment may provide the support member SP in which the stepped region is compensated and the reliability of the display device DD may be maintained.

The display device of the embodiment may include the support member in which the through-hole is defined, the polymer film disposed above the support member, the display panel disposed above the polymer film, the protective layer disposed above the display panel, and the electronic module disposed in a position that corresponds to the through-hole. The polymer film may include the protrusion portion that protrudes toward the support member, and the protrusion portion may be inserted into the through-hole of the support member to contact the electronic module. Accordingly, the stepped region of the support member may be compensated, thereby maintaining the reliability of the display device.

The method for manufacturing a display device of the embodiment may include providing the display panel, forming, the polymer film that includes the protrusion portion below the display panel, disposing the support member that has the through-hole defined therein below the polymer film, and disposing the protective layer above the display panel. Also, the method for manufacturing a display device of the embodiment may include bonding the support member, the polymer film, the display panel, and the protective layer which are sequentially stacked, and disposing the electronic module in a position that corresponds to the through-hole to face the protrusion portion. The method for manufacturing a display device of the embodiment may include the forming of the polymer film that includes the protrusion portion, and consequently, each of the components of the display device may be prevented from deforming during the bonding of the components. The display device manufactured by the method of the embodiment may have the appropriate reliability.

The display device of the embodiment may include the support member, the polymer film, the display panel, the protective layer, and the electronic module, and the support member may have the through-hole defined therein. The polymer film may include the protrusion portion inserted into the through-hole of the support member, and the protrusion portion and the electronic module may overlap each other within the through-hole. Accordingly, in the display device of the embodiment, the stepped region of the support member may be compensated, and the appropriate reliability may be ensured.

The embodiment includes the polymer film having the protrusion portion formed therein, and thus, the display device may be provided in which the stepped region of the support member is compensated.

The method for manufacturing a display device of the embodiment includes providing the polymer film having the protrusion portion formed therein, and thus, the display device may be provided in which the stepped region of the support member is compensated.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
   a support member including a through-hole;
   a polymer film disposed above the support member and including a protrusion portion protruding toward the support member, the protrusion portion including a polymer resin;
   a display panel disposed above the polymer film;
   a protective layer disposed above the display panel; and
   an electronic module disposed in a position corresponding to the through-hole and facing the protrusion portion, wherein
   the protrusion portion has a transmittance of about 85% or more in a wavelength range of about 400 nm to about 800 nm.

2. The display device of claim 1, wherein the protrusion portion and the electronic module overlap each other within the through-hole.

3. The display device of claim 1, wherein
   a bottom surface of the protrusion portion contacts a top surface of the electronic module, and
   a top surface of the protrusion portion directly contacts a bottom surface of the polymer film.

4. The display device of claim 1, wherein an area of a bottom surface of the protrusion portion is greater than or equal to an area of a top surface of the electronic module.

5. The display device of claim 1, wherein a bottom surface of the protrusion portion comprises an uneven pattern.

6. The display device of claim 1, further comprising a transparent adhesive layer disposed between the protrusion portion and the electronic module.

7. The display device of claim 1, further comprising a light blocking portion that surrounds a side surface of the protrusion portion.

8. The display device of claim 7, wherein the light blocking portion fills at least a portion of the through-hole.

9. The display device of claim 1, wherein
   the protrusion portion comprises first polymer resin, and
   the polymer film comprises second polymer resin different from the first polymer resin.

10. The display device of claim 1, wherein an edge of the protrusion portion contacts a surface of the support member.

11. The display device of claim 1, wherein the protrusion portion has a trapezoidal shape in a cross-sectional view, the trapezoidal shape having a short side and a long side facing each other.

12. A method for manufacturing a display device, the method comprising:
    providing a display panel;
    forming a polymer film below the display panel, the polymer film including a protrusion portion that includes a polymer resin;
    disposing a protective layer above the display panel;
    disposing a support member below the polymer film, the support member including a through-hole;
    bonding the support member, the polymer film, the display panel, and the protective layer with each other; and
    disposing an electronic module in a position that corresponds to the through-hole and faces the protrusion portion, wherein
    the protrusion portion protrudes toward the support member, and
    the protrusion portion has a transmittance of about 85% or more in a wavelength range of about 400 nm to about 800 nm.

13. The method of claim 12, wherein
    the protrusion portion comprises first polymer resin, and
    the polymer film comprises second polymer resin different from the first polymer resin.

14. The method of claim 12, wherein the forming of the polymer film includes:
    forming the protrusion portion and the polymer film by an inkjet process; and
    photo-curing the protrusion portion and the polymer film.

15. The method of claim 12, wherein the protrusion portion and the polymer film are formed simultaneously.

16. The method of claim 12, wherein the forming of the polymer film comprises forming an uneven pattern on a bottom surface of the protrusion portion that faces the electronic module.

17. The method of claim 12, wherein the bonding of the support member, the polymer film, the display panel, and the protective layer comprises forming an adhesive layer between the protrusion portion and the electronic module.

18. The method of claim 12, wherein the bonding of the support member, the polymer film, the display panel, and the protective layer comprises disposing a light blocking portion between the protrusion portion and the through-hole.

19. The method of claim 12, wherein the bonding of the support member, the polymer film, the display panel, and the protective layer comprises providing a roller above the protective layer to perform a pressing process on the protective layer.

* * * * *